(12) United States Patent
Beigel

(10) Patent No.: US 6,273,494 B1
(45) Date of Patent: Aug. 14, 2001

(54) POLE SYSTEM CONCEPT FOR THE INTERIOR OF A TRUCK VEHICLE

(75) Inventor: David J. Beigel, Kettering, OH (US)

(73) Assignee: International Truck & Engine Corp., Warrenville, IL (US)

(*) Notice: Subject to any disclaimer, the term of this patent is extended or adjusted under 35 U.S.C. 154(b) by 0 days.

(21) Appl. No.: 09/693,382

(22) Filed: Oct. 19, 2000

Related U.S. Application Data

(60) Provisional application No. 60/166,201, filed on Nov. 18, 1999, and provisional application No. 60/160,984, filed on Oct. 22, 1999.

(51) Int. Cl.[7] ............................ B60R 21/13; B60R 27/00; B60N 2/04; B60N 3/02
(52) U.S. Cl. ............................... 296/190.02; 296/190.9; 296/208; 296/188; 296/65.06; 280/756; 280/164.1
(58) Field of Search ......................... 296/190.02, 190.09, 296/208, 188, 65.06; 280/756, 164.1

(56) References Cited

U.S. PATENT DOCUMENTS

| | | | |
|---|---|---|---|
| 4,088,364 | * 5/1978 | Termont | 296/28 |
| 4,121,684 | * 10/1978 | Stephens et al. | 180/89.14 |
| 4,201,415 | * 5/1980 | Suchanek | 296/190 |
| 5,119,718 | * 6/1992 | Wagner et al. | 454/158 |
| 5,560,673 | * 10/1996 | Angelo | 296/190 |

\* cited by examiner

Primary Examiner—D. Glenn Dayoan
Assistant Examiner—Greg Blankenship
(74) Attorney, Agent, or Firm—Dennis Kelly Sullivan; Jeffrey Calfa; Neil Powell

(57) ABSTRACT

A support system for the interior of a mobile vehicle such as a tractor-trailer or over the road heavy truck. The support system provides vertical support poles for use with various features of the truck vehicle. The poles are integrated into the structure of the sleeper. They provide additional structural rigidity and limit the roof crush in the event of vehicle roll-over. The poles are equipped with various external accessories. They may have a swivel seat attached for additional seating within the sleeper. Sound system speakers may be hung from the poles and aimed where desired. A television or computer monitor may also be hung off the poles enabling adjustment for numerous viewing angles within the cab and the sleeper. The poles may also serve as a conduit for heating, ventilation, and air conditioning for the sleeper environment. The poles can serve as the air ducts or a separate duct could be installed within each pole to channel air to multiple air outlets. The poles are designed to distribute air to the lower and upper regions of the sleeper. The poles also may serve to hold openings and intake ducts, which draw air from the upper and lower regions of the sleeper for recirculation. The poles may also serve as mounting points for upper bunk access steps, being fixed in place to the side of the poles, or integrated into them with hinging capability. The integrated steps fold-up or down into the poles so as to be out of the way when not in use.

22 Claims, 4 Drawing Sheets

POLE SYSTEM CONCEPT FOR THE INTERIOR OF A TRUCK VEHICLE

This is the specification and claims for a non-provisional patent application claiming priority of provisional patent applications Ser. No. 60/160,984, filed Oct. 22, 1999 and Ser. No. 60/166,201, filed Nov. 18, 1999.

FIELD OF THE INVENTION

This invention relates generally to the interior of motor vehicles. More particularly, this invention relates to interior supports of a truck vehicle.

BACKGROUND OF THE INVENTION

Truck vehicles have limited interior space for the driver and passengers. In recent years, many features have expanded the space provided for the driver and passengers. Now, many truck designs include sleeping and storage compartments along with other features to enhance the comfort of the driver and passengers. With these features, the interior space of truck vehicles is more limited.

With limited space, truck designs seek to maximize the use of available space. However, the additional features also create the need for additional supports such as structural supports for the sleeper compartment, supports for the accessories, and supports for the upper bunks to name a few.

Accordingly, there is a need for a system to combine supports for various features in the interior of a truck vehicle.

SUMMARY OF THE INVENTION

As a result a primary object of the invention is to provide vertical sleeper supports combined with various features of the interior of the truck vehicle. The present invention satisfies the primary object of invention among others not stated. The present invention provides a support system for the interior of a truck vehicle. The support system provides vertical support poles for use with various features of the truck vehicle.

The poles are integrated into the structure of the sleeper. They provide additional structural rigidity and may limit the roof crush in the event of vehicle roll-over.

The poles also serve as an anchor point for the modular cabinetry system. They can hold the cabinetry in position either with quick release pins, or bolts.

The poles are equipped with various external accessories. For example, they may have a swivel seat attached for additional seating within the sleeper. Sound system speakers may be hung from the poles and aimed where desired. A television or computer monitor may also be hung off the poles enabling adjustment for numerous viewing angles within the cab and the sleeper.

The poles may also serve as a conduit for heating, ventilation, and air conditioning for the sleeper environment. The poles can serve as the air ducts or a separate duct could be installed within each pole to channel air to multiple air outlets. The poles are designed to distribute air to the lower and upper regions of the sleeper. The poles also may serve to hold openings and intake ducts, which draw air from the upper and lower regions of the sleeper for recirculation.

The poles may also serve as mounting points for upper bunk access steps, being fixed in place to the side of the poles, or integrated into them with hinging capability. The integrated steps fold up or down into the poles so as to be out of the way when not in use. The fold out steps may be mechanically actuated from a remote location such as the upper sleeper berth. They may be flipped up or down manually as shown in the figures. In addition, the poles hold integrated grab handles for access to the upper bunk via the bunk steps.

The poles may provide either fixed or fold out upper bunk rests as shown in the figures. The bunk rests may be actuated mechanically, deploying or retracting automatically as the bunk is lowered or raised from the back wall. The bunk rests may be actuated manually from the poles.

The poles may serve as pathways for running electrical wiring through the sleeper. The poles may serve to hold control panels for both the lower and upper bunk regions for cab and sleeper lighting, heating/air conditioning/ventilation controls, sound system and video controls, power outlets, and similar items.

The poles may be constructed as a modular unit, containing pre-assembled pieces for installation into the sleeper compartment as a completed unit on the assembly line. This eliminates the need to run separate ducts and wires through the rest of the sleeper.

DRAWINGS

Other objects and advantages of the invention will become more apparent upon perusal of the detailed description thereof and upon inspection of the drawings in which.

DETAILS OF INVENTION

Figure 1:
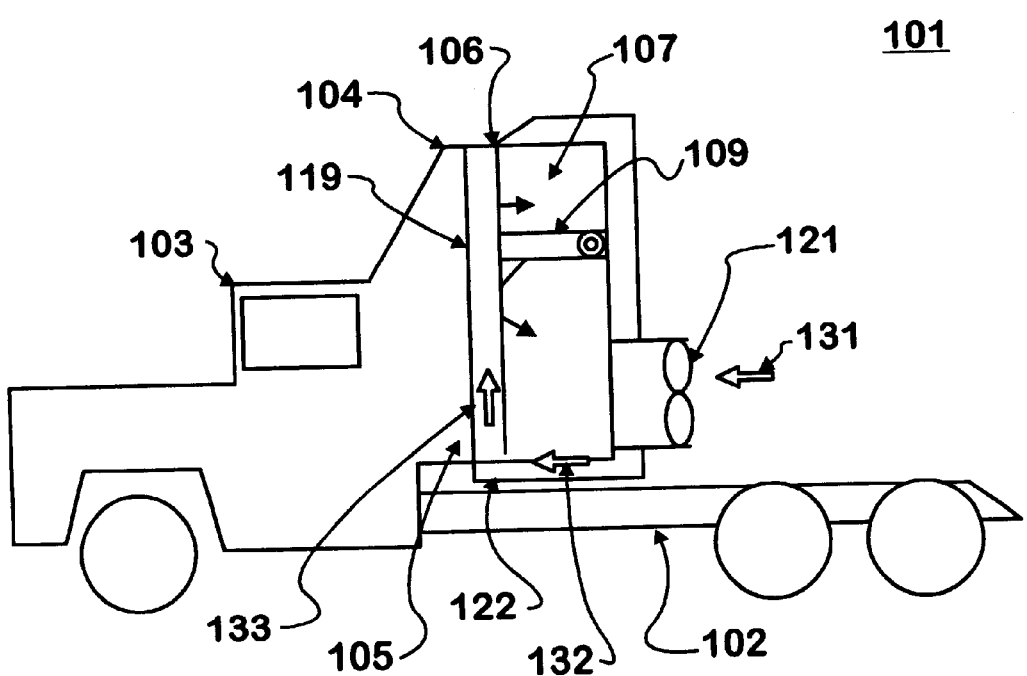
FIG. 1 is a side view and partial cutaway of a mobile vehicle with a pole system in the interior made in accordance with this invention.
Figure 2:
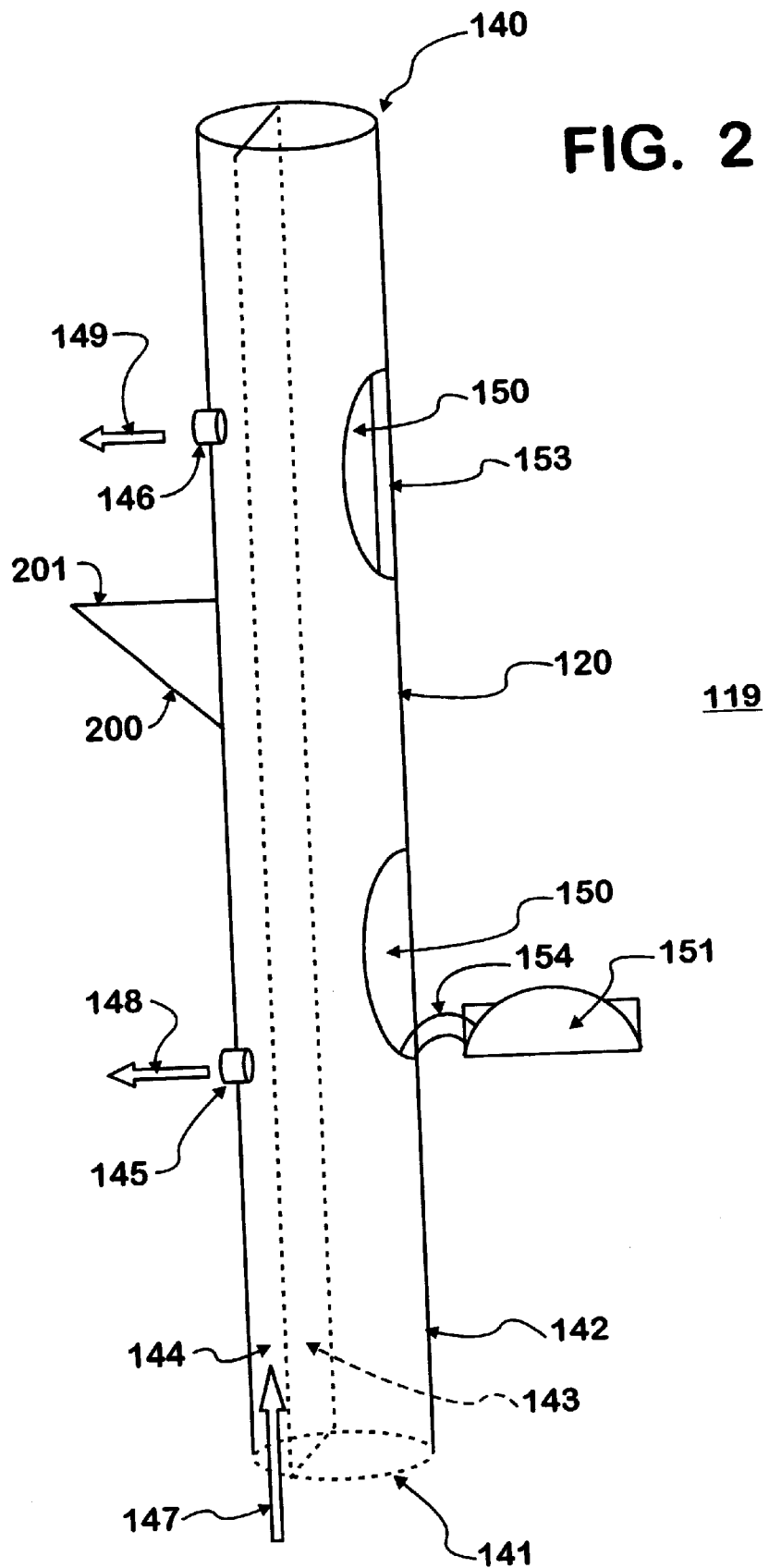
FIG. 2 is perspective view of one embodiment of a support pole system for installation in the pole system of FIG. 1.
Figure 3:
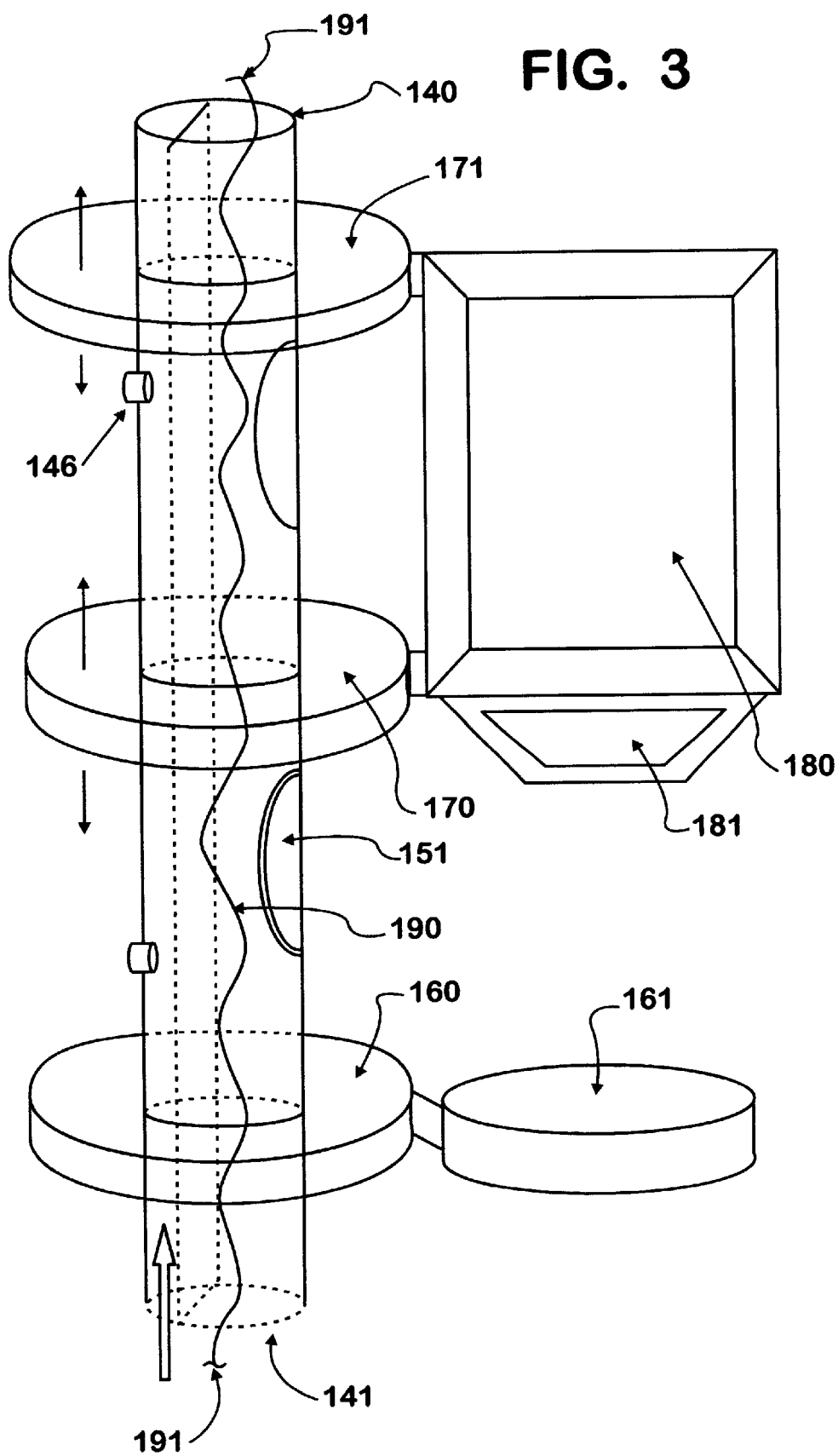
FIG. 3 is a perspective view of a second embodiment of a support pole for installation in the pole system of FIG. 1.
Figure 4:
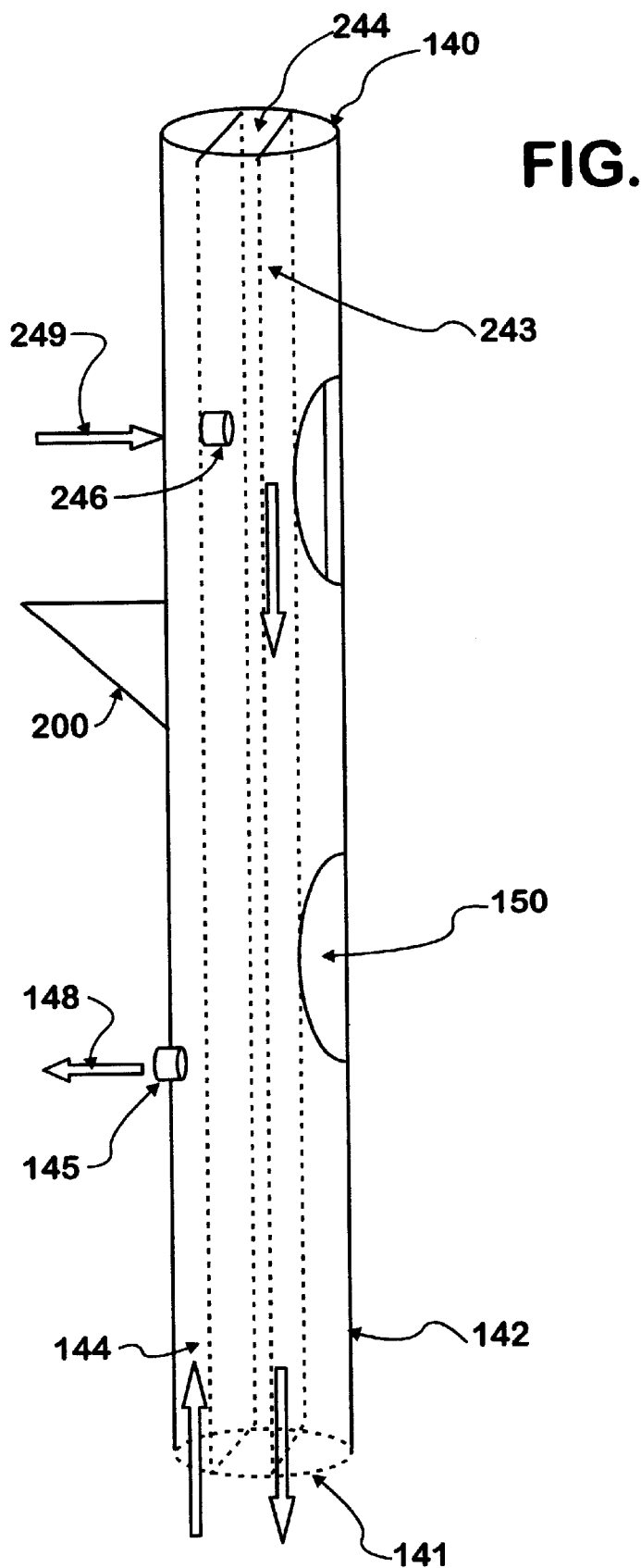
FIG. 4 is a perspective view of a third embodiment of a support pole for installation in the pole system of FIG. 1.

FIG. 1 depicts a mobile vehicle 101 with a pole system in the interior made in accordance with this invention. Two embodiments of vertical support pole systems 119 are shown in FIGS. 2 and 3. A technician may combine features in these two embodiments with some or all of the parts of the other for other embodiments of the invention. The vehicle 101 has chassis 102 with a cab 103 for a driver of the vehicle 101 engaged to the chassis 102. The vehicle 101 has a sleeper compartment 104 also known as a sleeper 104 engaged to the cab 103. The sleeper 104 has living space 107 in its interior that is located between a sleeper roof 106 and a sleeper floor 105. The living space 107 may include a sleeping bunk 109 that may fold down. The sleeper 104 may have an intake fan 121. The intake fan 121 may be separate from a cab ventilation unit or it may be the same unit. The intake unit 121 shown in FIG. 1 is located in a rearward area of the sleeper although it may be located in other suitable locations such as above or below the sleeper 104. The intake unit 121 may be connected to a vertical support pole 120 of the pole system 119 through ducting 122. The ducting 122 shown in FIG. 1 is below the sleeper 104 although the ducting 122 in the alternative may be above or through the sleeper 104.

There may be one or more vertical support poles 120 that span between the roof 106 and floor 105 of the sleeper 104. A top end 140 of the support pole 120 is engaged to the roof while a bottom end 141 is engaged to the floor 105. A vertical support pole 120 enhances the structural support of the sleeper 104 by inhibiting the crushing of the roof 106 toward the floor 105. The support pole 120 is made of a structurally robust material such as steel, aluminum, or a composite carbon material. The vertical support pole 120 has a hollow support section 142. The support section 142 may be tubular however rectangular is also acceptable. The support section 142 may contain an internal dividing wall 143 that defines an airflow passage 144. There is at least one air distribution duct 146 for distributing air to the living space 107 of the sleeper 104, however in the preferred embodiment there will be two air distribution ducts 145 and 146 at different elevations of the living space 107. Where there is an airflow passage 144 in the support section 142 of the vertical support pole 120, the air flow path into the sleeper 104 is shown through arrows 131, 132, 133, 147, 148, 149 and then out to the living space 107 through the air distribution ducts 145 and 146. There may also be an exhaust duct 246 engaged to an internal exhaust passage 244 within the support pole 120 also defined by a dividing wall 243. This would allow for circulation of air in the sleeper 104.

The vertical support pole 120 may include a segment of electrical wiring 190 engaged to an electrical system of the vehicle 101 at termination points 191. The termination points 191 may be easily connectable such as with a male or female connector in the event the vertical support pole 120 is manufactured as a separate module. In that event the support pole would include the pole system and be installable on an assembly line as a unit. The termination points 191 would be engaged to the electrical system of the vehicle following mechanical installation of the support pole 120.

The retractable sleeping bunk 109 may fold down as mentioned earlier. The support pole 120 may include a bunk bracket 200 that may support the bunk 109 when the bunk 200 is extended. The bunk bracket includes a horizontal bunk-resting surface 201 for receiving supporting a portion of the bunk.

The support pole 120 may contain an opening 150 with a fold out step 151. The step may fold out via a hinged connector 154. The fold out step 151 outer shape may be of a slightly smaller size than the opening 151 in the support pole 120 allowing for the fold out step 151 to nearly cover the opening 150 when the step 151 is retracted. This is shown in FIG. 3. An additional opening 150 may include a grab handle 153 that has an outer surface flush with the exterior of the support pole 120 as shown in FIG. 2. The grab handle 153 is preferably comprised of a vertical bar. The grab handle 153 combined with the fold out step 151 will improve access to upper areas of the living space 107, including access to a bunk 109 if there is one.

A monitor 180 for a computer or a television may be rotatably mounted to a support pole 120 as shown in FIG. 3, The monitor 180 when used is engaged to at least one ring 171 for allowing rotation of the monitor 180 from different positions to allow viewing from various locations within the rotation radius of the ring 171. The monitor 180 may be rotated into a stowed position in a cabinet of the sleeper 104. The ring 171 may be slid upwards or downwards along the support pole 120 to allow various horizontal locations for viewing. This flexibility of the monitor's 180 position is important in the limited space of a sleeper 104 a driver lives during vehicle transit. Where the monitor 180 is for a computer, a key board 181 may be engaged for rotation about the support pole 120 or the key board may be fixed in a conventional fashion on a table top of the sleeper 104. The monitor 180 may be held to the support pole 120 by two rings 170 and 171 for added stability. Where there are two rings 170 and 171, both rings may be slid upwards or downwards along the support pole 120. The monitor 180 may be powered through the electrical wiring 190.

A seat 161 may be rotatably engaged to the support pole 120 through a seat ring 160 as shown in FIG. 3. The rotatable seat 161 enhances the value of having a monitor 180 although a rotatable seat 161 may be separately installed.

The support pole 120 may be pre-installed to various sub-components mentioned above in various combinations to form a pole system 119 module. The module may than be installed into the sleeper as a unit on a main assembly line for the vehicle 101.

While the invention has been described and illustrated, this description is by way of example only. Additional advantages will occur readily to those skilled in the art, who may make changes without departing from the true spirit and scope of the invention. Therefore, the invention is not limited to the specific details, representative devices, and illustrated examples in this description.

I claim:

1. A mobile vehicle in combination with a pole system, comprising:
    a chassis with a cab for a driver engaged to the chassis;
    a sleeper compartment engaged to said cab;
    said sleeper compartment having an interior living space located between a sleeper roof and a sleeper floor;
    a vertical support pole in said sleeper compartment spanning between said roof and said floor of said sleeper;
    said support pole having an internal air flow passage;
    one air distribution duct engaged to said support pole air flow passage for distributing air to said living space of said sleeper; and
    a ventilation fan engaged through ducting to said support pole air flow passage to provide air flow to said support pole for distribution to said living space of said sleeper.

2. The mobile vehicle and pole system combination of claim 1, wherein:
    said support pole air flow passage being defined by an internal defining wall within said support pole.

3. The mobile vehicle and pole system combination of claim 2, wherein:
    said ducting between said ventilation fan and said support pole is run at least partially below said sleeper.

4. The mobile vehicle and pole system combination of claim 2, wherein:
    said ducting between said ventilation fan and said support pole is run at least partially above said sleeper.

5. The mobile vehicle and pole system combination of claim 3, wherein:
    said ventilation fan being located rearward of said sleeper.

6. The mobile vehicle and pole system combination of claim 2, wherein:
    said ventilation fan being an integral part of a cab ventilation system.

7. The mobile vehicle and pole system combination of claim 1, wherein:
    said support pole includes a segment of electrical wiring engaged to an electrical system of said vehicle.

8. The mobile vehicle and pole system combination of claim 1, wherein:
    said living space of said sleeper includes a retractable sleeping bunk; and
    said support pole includes a bunk bracket that may support said bunk when said bunk is extended.

9. The mobile vehicle and pole system combination of claim 1, further comprising:
an opening in said support pole with a fold out step.

10. The mobile vehicle and pole system combination of claim 9, wherein:
said fold out step outer shape is of a slightly smaller size than said opening in said support pole allowing for said fold out step to nearly cover said opening when said step is retracted.

11. The mobile vehicle and pole system combination of claim 9, wherein:
said support pole includes a second opening having a grab handle.

12. The mobile vehicle and pole system combination of claim 11, wherein:
said grab handle has an outer surface flush with an exterior of said support pole; and
said grab handle is a vertical bar.

13. The mobile vehicle and pole system combination of claim 1, further comprising:
a monitor rotatably mounted to said support pole.

14. The mobile vehicle and pole system combination of claim 1, wherein:
a ring about a portion of said support pole and engaged to said monitor allows rotation of said monitor to different viewing positions.

15. The mobile vehicle and pole system combination of claim 14, wherein:
said ring is slidably engaged to said support pole to allow various horizontal locations for viewing of said monitor.

16. The mobile vehicle and pole system combination of claim 15, wherein:
said monitor is a computer monitor of a computer; and
a keyboard is engaged to support pole for manipulation of said computer.

17. The mobile vehicle and pole system combination of claim 16, further comprising:
a seat is rotatably engaged to said support pole through a seat ring.

18. A pole system for installation in a sleeper of a mobile vehicle, the mobile vehicle having a chassis with a cab for a driver engaged to the chassis and a sleeper compartment engaged to the cab, the sleeper compartment having an interior living space located between a sleeper roof and a sleeper floor, and a ventilation fan engaged through ducting to the living space to provide air flow to the living space of the sleeper, comprising:
a vertical support pole for installation in said sleeper compartment of a length to span between the roof and the floor of the sleeper;
said support pole sufficiently rigid to provide structural support to the roof upon installation;
said support pole having an internal air flow passage;
an opening on an end of the support pole for engagement of said internal air flow passage to the ducting engaged to the ventilation fan upon installation of said support pole in the sleeper;
one air distribution duct engaged to said support pole air flow passage for distributing air to the living space of the sleeper from the ventilation fan;
said support pole air flow passage being defined by an internal defining wall within said support pole;
said support pole includes a bunk bracket that may support a bunk of the vehicle when the bunk is extended; and
an opening in said support pole with a fold out step.

19. The pole system of claim 18, further comprising:
said support pole includes a second opening having a grab handle.

20. A pole system for installation in a sleeper of a mobile vehicle, the mobile vehicle having a chassis with a cab for a driver engaged to the chassis and a sleeper compartment engaged to the cab, the sleeper compartment having an interior living space located between a sleeper roof and a sleeper floor, and a ventilation fan engaged through ducting to the living space to provide air flow to the living space of the sleeper, comprising:
a vertical support pole for installation in said sleeper compartment of a length to span between the roof and the floor of the sleeper;
said support pole sufficiently rigid to provide structural support to the roof upon installation;
said support pole having an internal air flow passage;
an opening on an end of the support pole for engagement of said internal air flow passage to the ducting engaged to the ventilation fan upon installation of said support pole in the sleeper;
one air distribution duct engaged to said support pole air flow passage for distributing air to the living space of the sleeper from the ventilation fan;
said support pole includes a segment of electrical wiring for engagement to an electrical system of the vehicle;
a monitor rotatably mounted to said support pole; and
a seat is rotatably engaged to said support pole through a seat ring.

21. A pole system for installation in a sleeper of a mobile vehicle, the mobile vehicle having a chassis with a cab for a driver engaged to the chassis and a sleeper compartment engaged to the cab, the sleeper compartment having an interior living space located between a sleeper roof and a sleeper floor, and a ventilation fan engaged through ducting to the living space to provide air flow to the living space of the sleeper, comprising:
a vertical support pole for installation in said sleeper compartment of a length to span between the roof and the floor of the sleeper;
said support pole sufficiently rigid to provide structural support to the roof upon installation;
said support pole having an internal supply air flow passage;
said support pole having an internal exhaust air flow passage;
an opening on an end of the support pole for engagement to one of said internal air flow passages to the ducting engaged to the ventilation fan upon installation of said support pole in the sleeper;
one air distribution duct engaged to each said support pole air flow passage for distributing air to the living space of the sleeper from the ventilation fan; and said support pole air flow passage being defined by an internal defining wall within said support pole.

22. The pole system of claim 18, wherein: said support pole includes a segment of electrically wiring for engagement to an electrical system of the vehicle;

* * * * *